United States Patent
Chen et al.

(10) Patent No.: US 8,690,275 B2
(45) Date of Patent: Apr. 8, 2014

(54) POWER SUPPLY INTEGRATED CIRCUIT FOR PIEZOELECTRIC INKJET HEAD

(75) Inventors: Shih-Chang Chen, Hsinchu (TW); Shih-Che Chiu, Hsinchu (TW); Tsung-Pat Chou, Hsinchu (TW)

(73) Assignee: Microjet Technology Co., Ltd., Hsinchu (TW)

( * ) Notice: Subject to any disclaimer, the term of this patent is extended or adjusted under 35 U.S.C. 154(b) by 277 days.

(21) Appl. No.: 13/273,416

(22) Filed: Oct. 14, 2011

(65) Prior Publication Data

US 2012/0092399 A1 Apr. 19, 2012

(30) Foreign Application Priority Data

Oct. 14, 2010 (CN) .......................... 2010 1 0517989

(51) Int. Cl.
*B41J 29/38* (2006.01)
(52) U.S. Cl.
USPC ..................................... 347/5; 347/9; 347/10

(58) Field of Classification Search
USPC ............................................. 347/5, 9, 10, 12
See application file for complete search history.

(56) References Cited

U.S. PATENT DOCUMENTS

| 7,104,622 B2* | 9/2006 | Fukano et al. ..................... 347/9 |
| 2004/0036724 A1* | 2/2004 | Masuda et al. ..................... 347/9 |
| 2007/0080977 A1* | 4/2007 | Sato ................................. 347/5 |

* cited by examiner

*Primary Examiner* — Lam S Nguyen
(74) *Attorney, Agent, or Firm* — Kirton McConkie; Evan R. Witt (57) ABSTRACT

A power supply integrated circuit includes a DC-DC boost regulating unit and a DC-AC output controlling unit. The DC-DC boost regulating unit is used for increasing a low DC voltage into a high DC voltage. The DC-AC output controlling unit is connected with the DC-DC boost regulating unit for converting the high DC voltage into a high AC voltage. A first portion of an integrated circuit chip and a plurality of passive components are collaboratively defined as the DC-DC boost regulating unit. A second portion of the integrated circuit chip is defined as the DC-AC output controlling unit.

2 Claims, 8 Drawing Sheets

POWER SUPPLY INTEGRATED CIRCUIT FOR PIEZOELECTRIC INKJET HEAD

FIELD OF THE INVENTION

The present invention relates to a power supply integrated circuit, and more particularly to a power supply integrated circuit for a piezoelectric inkjet head.

BACKGROUND OF THE INVENTION

An inkjet printer is usually equipped with a piezoelectric actuator. Due to a high-speed reciprocating motion of the piezoelectric actuator, the inkjet printer can eject ink droplets. Generally, the high-speed reciprocating motion of the piezoelectric actuator is driven by a high AC voltage. When the piezoelectric actuator is driven by the high AC voltage, the piezoelectric actuator continuously and periodically issues a control signal to a single-nozzle or multi-nozzle vibration plate. According to the control signal, the single-nozzle or multi-nozzle vibration plate is enabled to perform the reciprocating motion. Consequently, the ink droplet is ejected out through a single-nozzle or multi-nozzle inkjet head. That is, the piezoelectric actuator can be applied to an inkjet printer with the single-nozzle or multi-nozzle inkjet head. Moreover, the piezoelectric actuator can be applied to a micro-dispensing pipette such as a biochemistry medical laboratory instrument or industrial dispensing equipment.

Conventionally, the power supply for powering the piezoelectric actuator comprises a DC-DC converting circuit and a DC-AC converting circuit. Since the DC-DC converting circuit and the DC-AC converting circuit are discrete circuits, the conventional power supply needs not only a large number of electronic components but also a coil-type transformer. Under this circumstance, the area of the circuit board and the fabricating cost are both increased.

Figure 1:
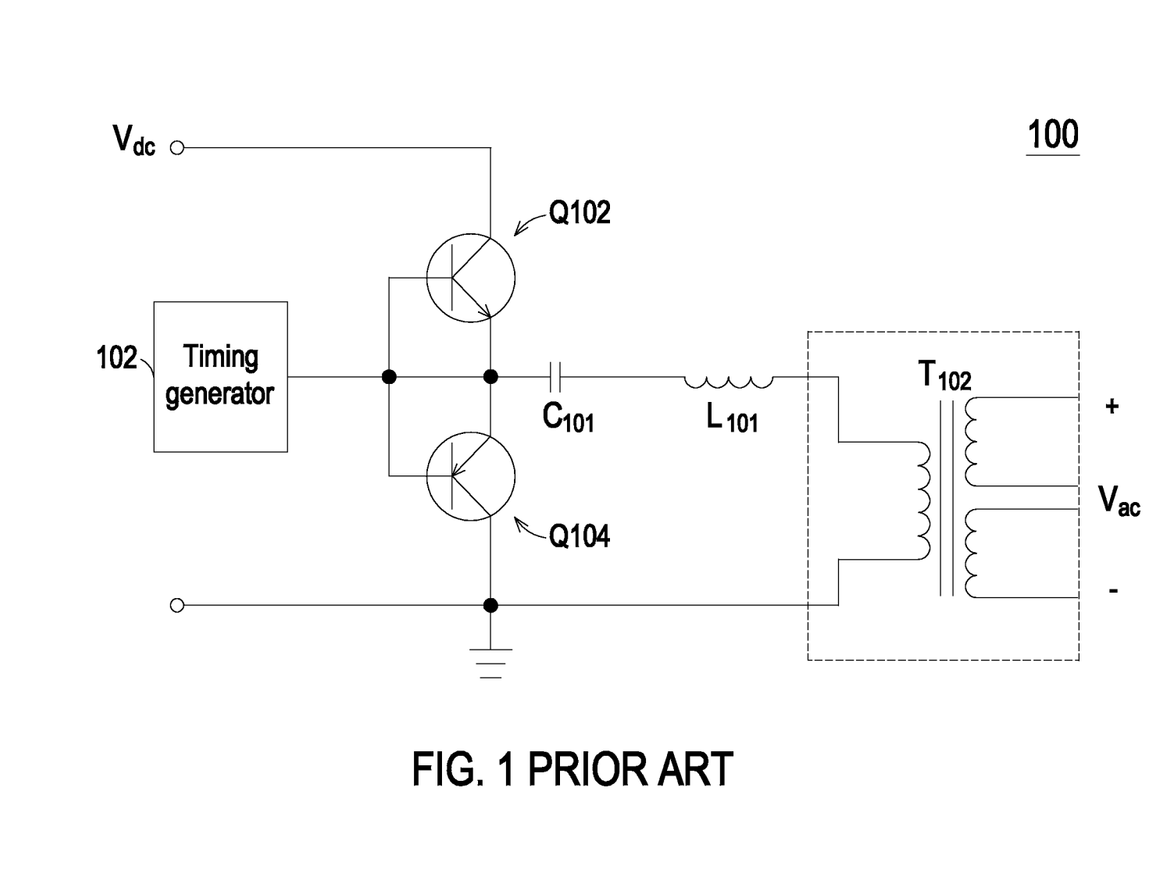
FIG. 1 is a schematic circuit block diagram illustrating a DC-AC converting circuit of a conventional power supply for powering a piezoelectric actuator.

FIG. 1 is a schematic circuit block diagram illustrating a DC-AC converting circuit of a conventional power supply for powering a piezoelectric actuator. As shown in FIG. 1, the DC-AC converting circuit 100 comprises a timing generator 102, two switch elements Q102, Q104, a resonant circuit composed of a resonant capacitor $C_{101}$ and a resonant inductor $L_{101}$, and a transformer $T_{102}$. According to a switching control signal provided by the timing generator 102, the switch elements Q102 and Q104 are alternately conducted or shut off, and thus the electric energy of the DC input voltage $V_{dc}$ is transmitted to the primary side of the transformer $T_{102}$. The resonant circuit ($C_{101}$, $L_{101}$) is used for generating resonance to transmit the electric energy of the DC input voltage $V_{ac}$ to the primary side of the transformer $T_{102}$. According to the turn ratio of the primary winding to the secondary winding of the transformer $T_{102}$, an AC voltage $V_{ac}$ is induced and outputted from the secondary side of the transformer $T_{102}$. The AC voltage $V_{ac}$ is used for driving a piezoelectric actuator (not shown). Since the way of increasing the voltage is performed by adjusting the turn ratio of the transformer $T_{102}$, the voltage-increasing capability of the DC-AC converting circuit 100 is usually insufficient to drive the piezoelectric actuator of the inkjet printer with the single-nozzle or multi-nozzle inkjet head.

Figure 2:
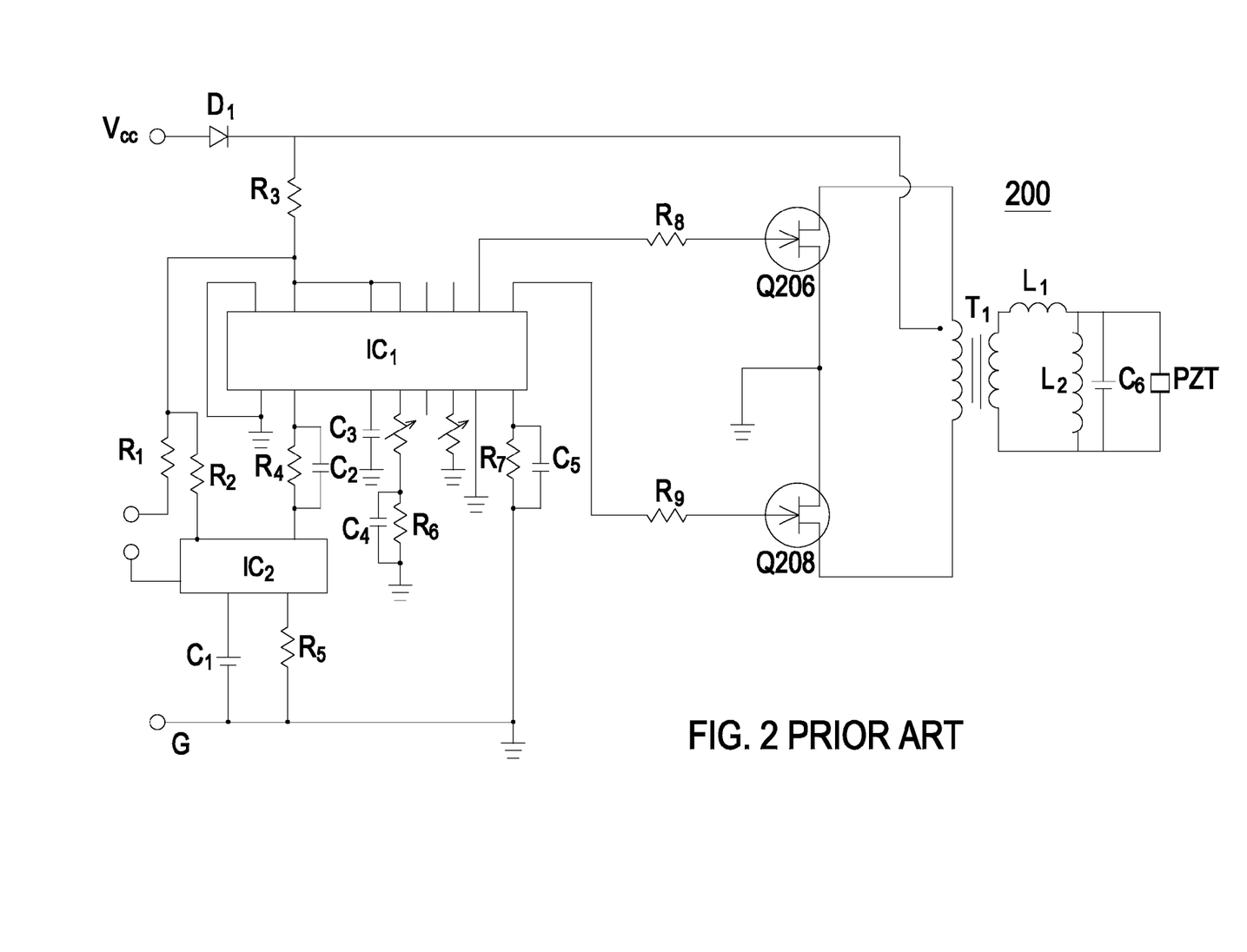
FIG. 2 is a schematic circuit block diagram illustrating a DC-AC converting circuit of another conventional power supply for powering a piezoelectric actuator.

FIG. 2 is a schematic circuit block diagram illustrating a DC-AC converting circuit of another conventional power supply for powering a piezoelectric actuator. As shown in FIG. 2, the DC-AC converting circuit 200 comprises a detecting circuit $IC_2$, a switching control circuit $IC_1$, two switch elements Q206, Q208, a transformer $T_1$, and an output filter circuit ($L_1$, $L_2$, $C_6$). The DC-AC converting circuit 200 is used for driving a piezoelectric actuator PZT. The detecting circuit $IC_2$ is used for detecting an output voltage of the DC-AC converting circuit 200. According to the detecting result generated by the detecting circuit $IC_2$, the switching control circuit $IC_1$ generates a switching control signal to control the on/off statuses of the switch elements Q206 and Q208. By alternately turning on/off the switch elements Q206 and Q208, the electric energy of the DC input voltage $V_{dc}$ is transmitted to the primary side of the transformer $T_1$. In addition, by alternately turning on/off the switch elements Q206 and Q208, the electric energy of the DC input voltage $V_{dc}$ is transmitted to the secondary side of the transformer $T_1$. As a consequence, an AC voltage is outputted from the secondary side of the transformer $T_1$. Moreover, after the noise contained in the AC voltage is filtered by the output filter circuit ($L_1$, $L_2$, $C_6$), an output AC voltage is generated to drive the piezoelectric actuator PZT. Since a large number of electronic components and a coil-type transformer are necessary to constitute the DC-AC converting circuit 200, the performance of the DC-AC converting circuit 200 applied to the piezoelectric inkjet head is usually unsatisfied.

SUMMARY OF THE INVENTION

The present invention provides a power supply integrated circuit for a piezoelectric inkjet head. The power supply integrated circuit is configured for powering and driving the piezoelectric inkjet head. The power supply integrated circuit includes a DC-DC boost regulating unit and a DC-AC output controlling unit, which are integrated into a same integrated circuit chip. Consequently, the number of electronic component is reduced, the circuitry complexity is simplified, no coil-type transformer is included, the power converting efficiency is enhanced, and the fabricating cost is reduced.

In accordance with an aspect of the present invention, there is provided a power supply integrated circuit for a piezoelectric inkjet head. The power supply integrated circuit includes a DC-DC boost regulating unit and a DC-AC output controlling unit. The DC-DC boost regulating unit is used for increasing a low DC voltage into a high DC voltage. The DC-AC output controlling unit is connected with the DC-DC boost regulating unit for converting the high DC voltage into a high AC voltage. A first portion of an integrated circuit chip and a plurality of passive components are collaboratively defined as the DC-DC boost regulating unit. A second portion of the integrated circuit chip is defined as the DC-AC output controlling unit.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3:
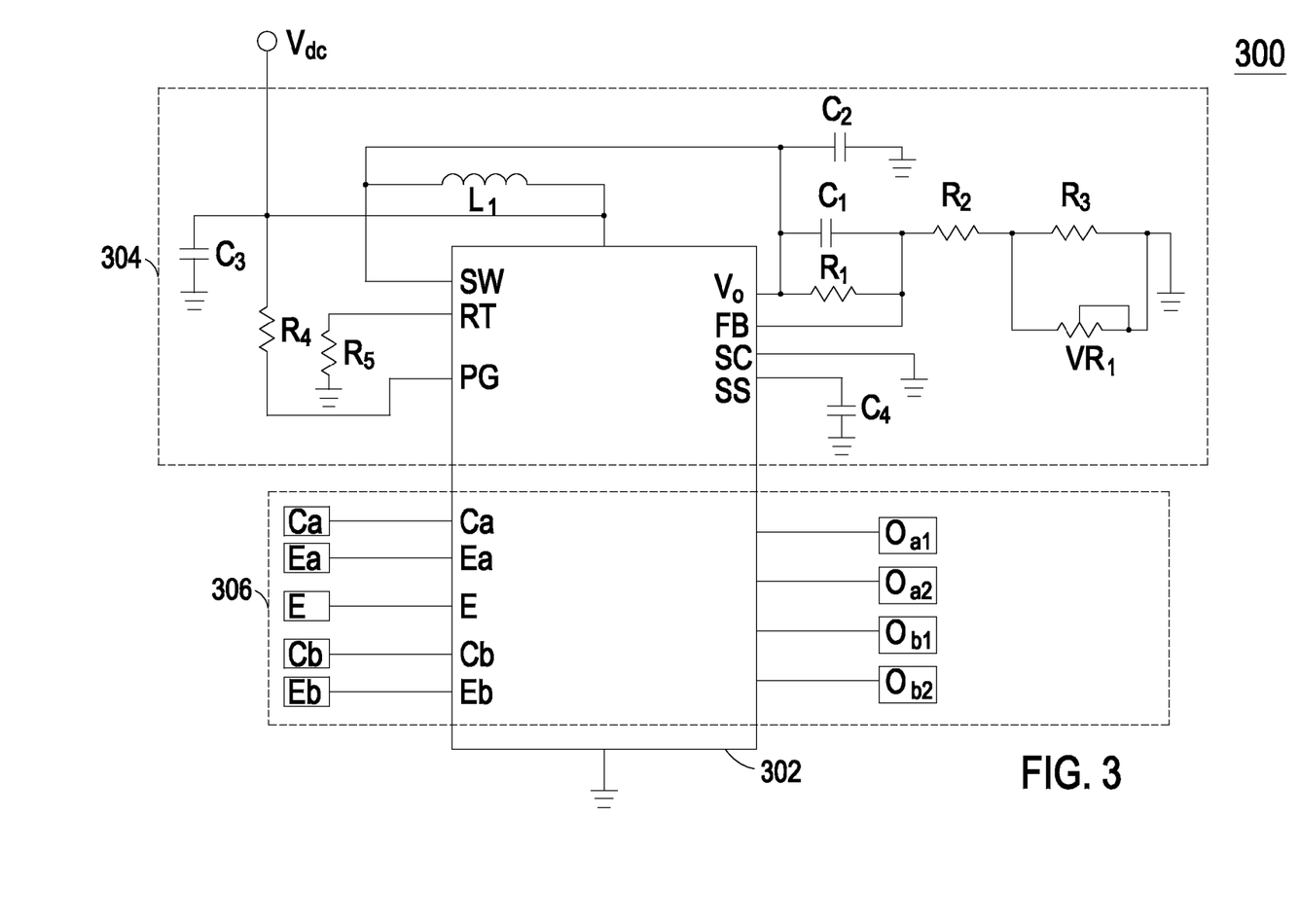
FIG. 3 is a schematic circuit block diagram illustrating a power supply integrated circuit according to an embodiment of the present invention.

FIG. 3 is a schematic circuit block diagram illustrating a power supply integrated circuit according to an embodiment of the present invention. The power supply integrated circuit 300 is used for converting a low DC voltage into at least one high AC voltage, thereby driving a piezoelectric actuator. As shown in FIG. 3, a low DC voltage $V_{dc}$ is converted into a high AC voltage by an integrated circuit chip 302. The power supply integrated circuit 300 comprises a DC-DC boost regulating unit 304 and a DC-AC output controlling unit 306. A first portion of the integrated circuit chip 302 and some passive components are collaboratively defined as the DC-DC boost regulating unit 304. In addition, a second portion of the integrated circuit chip 302 is defined as the DC-AC output controlling unit 306. The DC-DC boost regulating unit 304 is used for increasing the low DC voltage $V_{dc}$ into a high DC voltage $V_o$. In an embodiment, the magnitude of the low DC voltage $V_{dc}$ is about 2.7~10V, and the high DC voltage $V_o$ is about 40V.

In an embodiment, the high DC voltage $V_o$ may be calculated by the formula 1 or the formula 2.

$$V_o = 1.225 \times (R_1/(R_2+R_3)+1) \quad (1)$$

$$V_o = 1.225 \times (R_1/(R_2+VR_1)+1) \quad (2)$$

The resistor $R_3$ and the variable resistor $VR_1$ of the DC-DC boost regulating unit 304 are alternative. If the resistor $R_3$ is included in the DC-DC boost regulating unit 304 but the variable resistor $VR_A$ is excluded, the high DC voltage $V_o$ is calculated by the formula 1. If the variable resistor $VR_A$ is included in the DC-DC boost regulating unit 304 but the resistor $R_3$ is excluded, the high DC voltage $V_o$ is calculated by the formula 2.

The DC-AC output controlling unit 306 is used for converting the high DC voltage $V_o$ into a high AC voltage. As shown in FIG. 3, the DC-AC output controlling unit 306 provides two output voltage groups ($O_{a1}$, $O_{a2}$) and ($O_{b1}$, $O_{b2}$). The output voltage group "a" ($O_{a1}$, $O_{a2}$) is controlled according to the control signals Ca and Ea. The output voltage group "b" ($O_{b1}$, $O_{b2}$) is controlled according to the control signals Cb and Eb. The high-level state and the low-level state of the control signal Ca are used for controlling the out-of-phase output voltages $O_{a1}$ and $O_{a2}$ of the group "a" to be outputted. The high-level state and the low-level state of the control signal Ea are used for controlling whether the out-of-phase output voltages $O_{a1}$ and $O_{a2}$ of the group "a" are outputted or not. Similarly, the high-level state and the low-level state of the control signal Cb are used for controlling the out-of-phase output voltages $O_{b1}$ and $O_{b2}$ of the group "b" to be outputted. The high-level state and the low-level state of the control signal Eb are used for controlling whether the out-of-phase output voltages $O_{b1}$ and $O_{b2}$ of the group "b" are outputted or not. The high-level state and the low-level state of the main control signal E are both used for controlling all of the output voltage groups and all of the control signals to be generated. For example, the signal at the high-level state has a voltage magnitude greater than 1.5V, and the signal at the low-level state has a voltage magnitude smaller than 0.3V. The real output voltage that is really transmitted to the two electrodes of the piezoelectric inkjet head are $O_{a1}$-$O_{a2}$ or $O_{b1}$-$O_{b2}$.

As previously described, the DC-DC converting circuit and the DC-AC converting circuit of the conventional power supply are discrete circuits. According to the present invention, the DC-DC boost regulating unit 304 and the DC-AC output controlling unit 306 are integrated into the power supply integrated circuit 300.

Figure 4A:
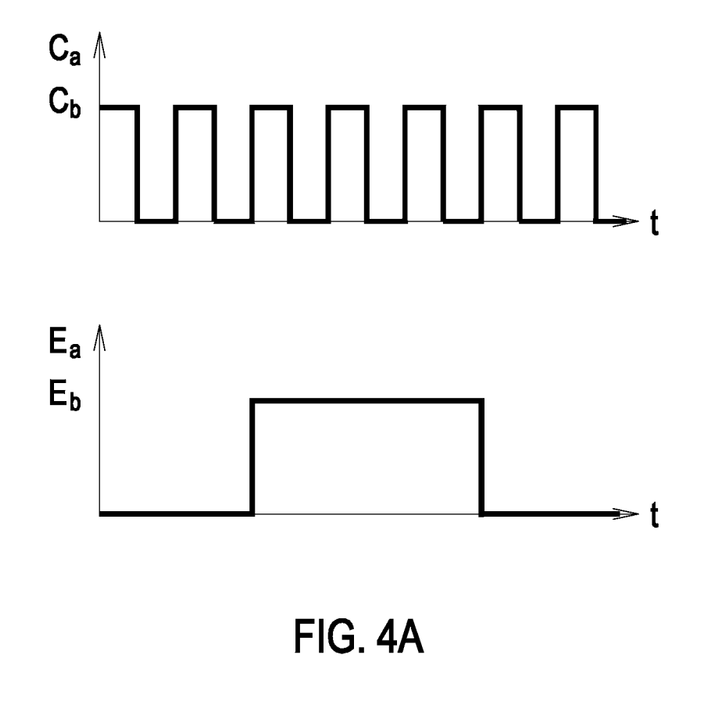
FIG. 4A is a schematic timing waveform diagram illustrating the control signals Ca, Cb, Ea and Eh.
Figure 4B:
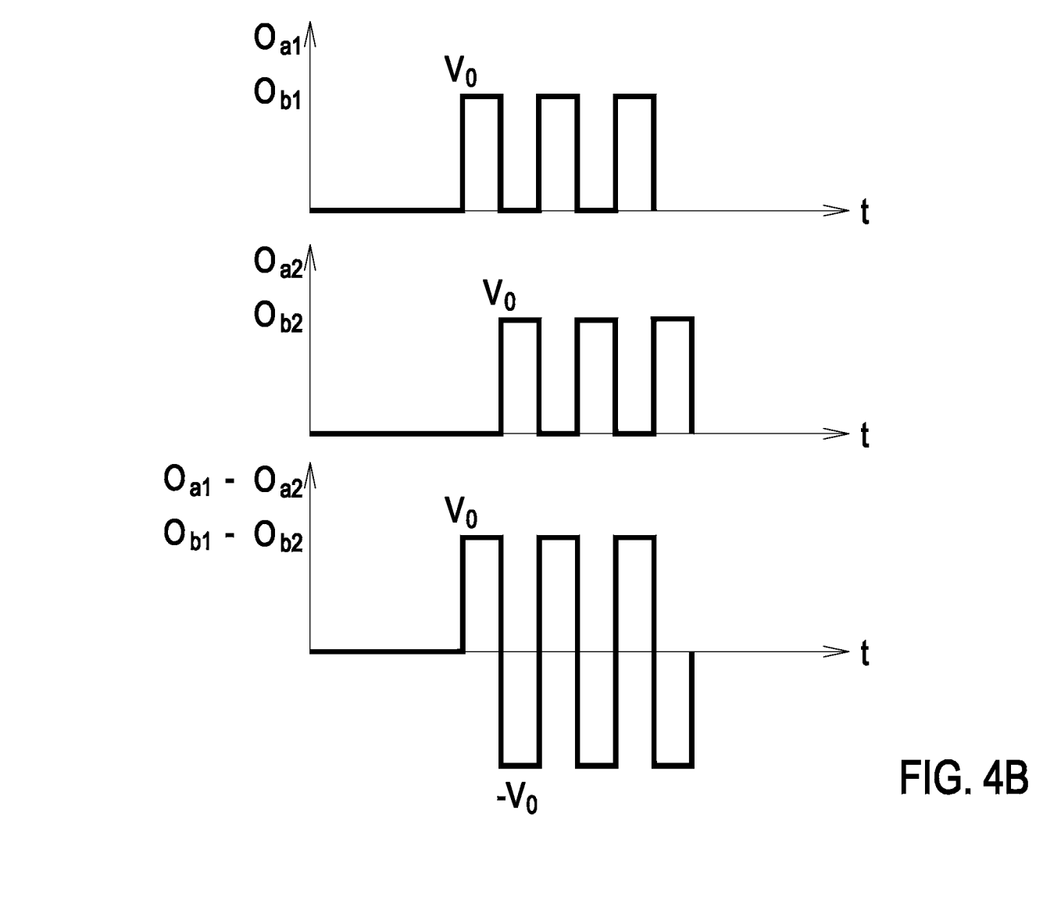
FIG. 4B is a schematic timing waveform diagram illustrating the output voltages $O_{a1}$, $O_{b1}$, $O_{a2}$ and $O_{b2}$ and the real output voltages $O_{a1}$-$O_{a2}$ and $O_{b1}$-$O_{b2}$.
Figure 5:
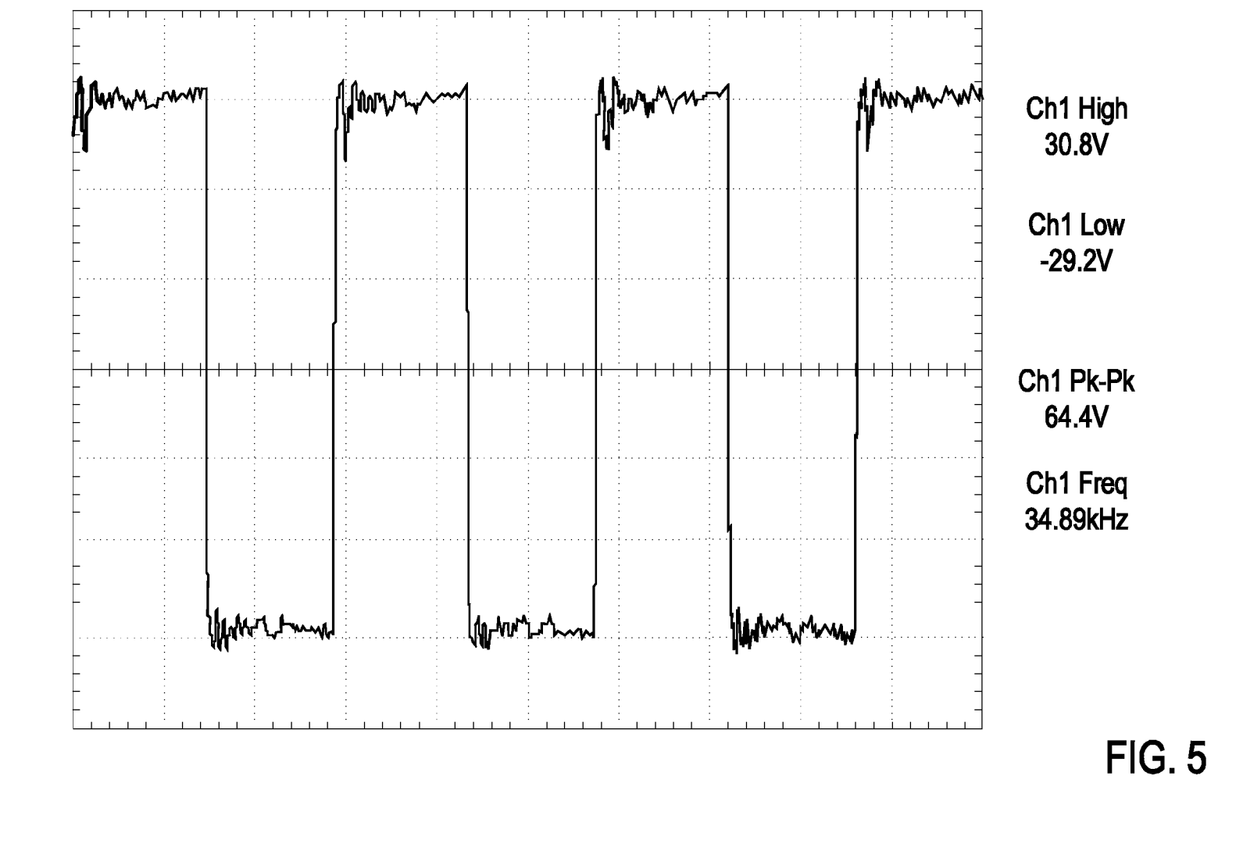
FIG. 5 is a schematic scanning voltage waveform diagram illustrating the real output voltages $O_{a1}$-$O_{a2}$ and $O_{b1}$-$O_{b2}$.

FIG. 4A is a schematic timing waveform diagram illustrating the control signals Ca, Cb, Ea and Eb. FIG. 4B is a schematic timing waveform diagram illustrating the output voltages $O_{a1}$, $O_{b1}$, $O_{a2}$ and $O_{b2}$ and the real output voltages $O_{a1}$-$O_{a2}$ and $O_{b1}$-$O_{b2}$. FIG. 5 is a schematic scanning voltage waveform diagram illustrating the real output voltages $O_{a1}$-$O_{a2}$ and $O_{b1}$-$O_{b2}$. As shown in FIG. 4, the magnitudes of the output voltages $O_{a1}$, $O_{b1}$, $O_{a2}$ and $O_{b2}$ are all equal to $V_o$. The output voltages $O_{a1}$ and $O_{a2}$ are out of phase. The output voltages $O_{b1}$ and $O_{b2}$ are out of phase. The waveforms of the real output voltages $O_{a1}$-$O_{a2}$ and $O_{b1}$-$O_{b2}$ transmitted to the piezoelectric actuator are shown in FIG. 4B and FIG. 5. As shown in the drawings, the real output voltages $O_{a1}$-$O_{a2}$ and $O_{b1}$-$O_{b2}$ include alternate $V_o$ and $-V_o$. That is, the waveform of the real output voltage $O_{a1}$-$O_{a2}$ or $O_{b1}$-$O_{b2}$ is a rectangular wave for driving the reciprocating motions of the piezoelectric actuator.

Figure 6:
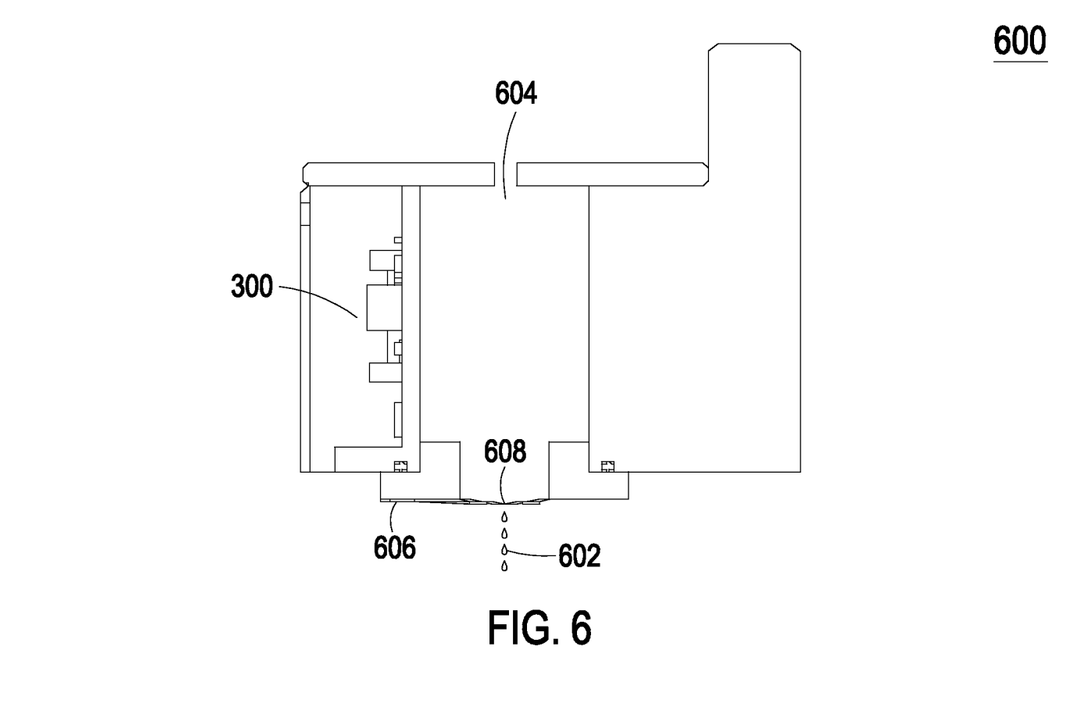
FIG. 6 is a schematic view illustrating a piezoelectric inkjet head using the power supply integrated circuit.

FIG. 6 is a schematic view illustrating a piezoelectric inkjet head using the power supply integrated circuit 300. In this context, similar components are designated by similar numeral references. As shown in FIG. 6, the piezoelectric inkjet head 600 is configured for ejecting ink droplets 602. The piezoelectric inkjet head 600 comprises an ink buffer chamber 604 and a piezoelectric actuator 606. The ink buffer chamber 604 is used for temporarily storing ink. The piezoelectric actuator 606 is used for providing reciprocating motions, so that the ink temporarily stored in the ink buffer chamber 604 can be ejected out through the nozzle 608. The power supply integrated circuit 300 of the piezoelectric inkjet head 600 is used for driving the reciprocating motions of the piezoelectric actuator 606. The circuitry of the power supply integrated circuit 300 is shown in FIG. 3.

Figure 7:
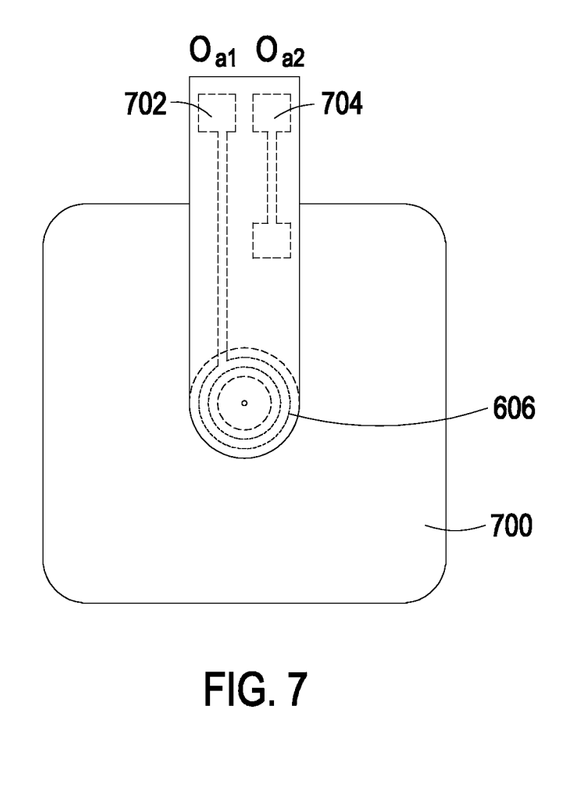
FIG. 7 is a schematic top view illustrating the piezoelectric actuator of the piezoelectric inkjet head as shown in FIG. 6.

FIG. 7 is a schematic top view illustrating the piezoelectric actuator of the piezoelectric inkjet head as shown in FIG. 6. As shown in FIG. 7, the piezoelectric actuator 606 is a ring-shaped resilient piece, which is disposed on a flexible printed circuit board 700. The output voltages $O_{a1}$ and $O_{a2}$ from the power supply integrated circuit 300 are transmitted to the piezoelectric actuator 606 through two electrodes 702 and 704, thereby driving the reciprocating motions of the piezoelectric actuator 606.

From the above description, the present invention provides a power supply integrated circuit for a piezoelectric inkjet head. The power supply integrated circuit includes a DC-DC boost regulating unit and a DC-AC output controlling unit. The DC-DC boost regulating unit is used for increasing a low DC voltage into a high DC voltage. The DC-AC output controlling unit is connected with the DC-DC boost regulating unit for converting the high DC voltage into a high AC voltage. The DC-DC boost regulating unit and the DC-AC output controlling unit are integrated into a same integrated circuit chip. Consequently, the number of electronic component is reduced, the circuitry complexity is simplified, no coil-type transformer is included, the power converting efficiency is enhanced, and the fabricating cost is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supply integrated circuit for a piezoelectric inkjet head, comprising:
   a DC-DC boost regulating unit for increasing a low DC voltage into a high DC voltage; and
   a DC-AC output controlling unit connected with said DC-DC boost regulating unit for converting said high DC voltage into a high AC voltage;
   multiple groups of output voltages for driving said piezoelectric inkjet head, and wherein each of said multiple groups of output voltages has two output voltages which have identical voltage magnitude but are out of phase;
   multiple groups of control signals for controlling generation of respective groups of output voltages, and wherein each group of control signal corresponds to one of said multiple groups of output voltages;
   a main control signal for controlling generation of said multiple groups of control signals and said multiple groups of output voltages;
   wherein said DC-DC boost regulating unit and said DC-AC output controlling unit are integrated into the power supply integrated circuit, and a first portion of an integrated circuit chip and a plurality of passive components are collaboratively defined as said DC-DC boost regulating unit, and a second portion of said integrated circuit chip is defined as said DC-AC output controlling unit.

2. The power supply integrated circuit according to claim 1 wherein said DC-AC output controlling unit provides said main control signal for controlling generation of said multiple groups of control signals and said multiple groups of output voltages.

* * * * *